United States Patent
Rosenbloom et al.

(10) Patent No.: US 7,490,175 B2
(45) Date of Patent: Feb. 10, 2009

(54) COMPUTER SYSTEM AND METHOD FOR SUPPORTING NETWORK-ENABLED DEVICES

(75) Inventors: Oren Rosenbloom, Redmond, WA (US); Vladimir Sadovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/672,096

(22) Filed: Feb. 7, 2007

(65) Prior Publication Data

US 2007/0168576 A1    Jul. 19, 2007

Related U.S. Application Data

(63) Continuation of application No. 10/447,557, filed on May 29, 2003, now Pat. No. 7,197,580.

(51) Int. Cl.
G06F 3/00 (2006.01)
G06F 13/00 (2006.01)
G06F 15/177 (2006.01)
G06F 3/12 (2006.01)

(52) U.S. Cl. ................. 710/15; 710/10; 710/13; 710/16; 710/104; 709/220; 709/223; 358/1

(58) Field of Classification Search .................. None
See application file for complete search history.

(56) References Cited

U.S. PATENT DOCUMENTS

| | | | | |
|---|---|---|---|---|
| 6,424,424 B1* | 7/2002 | Lomas et al. | ............ | 358/1.14 |
| 6,530,018 B2* | 3/2003 | Fleming, III | ............ | 713/1 |
| 6,557,033 B2* | 4/2003 | Maeda | ............ | 709/223 |
| 6,687,817 B1* | 2/2004 | Paul | ............ | 713/1 |
| 6,779,004 B1* | 8/2004 | Zintel | ............ | 709/227 |
| 6,795,846 B1* | 9/2004 | Merriam | ............ | 709/203 |
| 6,978,319 B1* | 12/2005 | Rostoker et al. | ............ | 709/250 |
| 2002/0122199 A1* | 9/2002 | Lomas et al. | ............ | 358/1.14 |
| 2002/0156947 A1* | 10/2002 | Nishio | ............ | 710/36 |
| 2003/0005100 A1* | 1/2003 | Barnard et al. | ............ | 709/223 |
| 2003/0055958 A1* | 3/2003 | Russell et al. | ............ | 709/224 |
| 2003/0160993 A1* | 8/2003 | Kang | ............ | 358/1.15 |
| 2003/0200371 A1* | 10/2003 | Abujbara | ............ | 710/305 |
| 2004/0047358 A1* | 3/2004 | Chen et al. | ............ | 370/401 |

* cited by examiner

*Primary Examiner*—Alan Chen
(74) *Attorney, Agent, or Firm*—Shook, Hardy & Bacon L.L.P.

(57) ABSTRACT

A computer-implemented method and system are provided for supporting hardware devices that are connected to the computer via a network. The existence of any hardware device connected on the network is detected in the method. Information descriptive of the connected device is then obtained, either from the device or from the user. Based upon the obtained information, a logical representation of the connected device is created. The driver for the detected device is then located and installed. From this point on, the network-connected hardware device appears to the computer in the same manner as a locally connected hardware device.

4 Claims, 3 Drawing Sheets

COMPUTER SYSTEM AND METHOD FOR SUPPORTING NETWORK-ENABLED DEVICES

CROSS-REFERENCE TO RELATED APPLICATIONS

This application is a continuation of U.S. application Ser. No. 10/447,557 filed May 29, 2003, now pending, entitled COMPUTER SYSTEM AND METHOD FOR SUPPORTING NETWORK-ENABLED DEVICES, is herein incorporated by reference.

STATEMENT REGARDING FEDERALLY SPONSORED RESEARCH OR DEVELOPMENT

None.

BACKGROUND OF THE INVENTION

Over the years, computer systems have evolved from stand alone devices into devices that increasingly communicate over a network. This network environment has made its way into home networking and other small network environments. One of the advantages of these networks is the ability to have multiple computing stations while minimizing the capital expended on peripheral devices. These peripheral devices often include printers, scanners, and/or facsimile machines. Some peripheral devices are now available that are multifunction devices. These multifunction devices often combine such things as the printer, scanner, and facsimile machine. The multifunction devices are now moving to a model that allows their use in a network environment. The manufacturers of these devices are recognizing increasing benefits to operation in a network and are therefore moving away from other hard connectors and bus protocols. Additionally, the technology continues to move toward operation in a wireless environment. In this wireless environment, peripherals communicate with a host computer without a hard or cable connection. In this wireless communication model, the bottom level of connectivity will be networked. Therefore, there exists a need to support and manage peripheral devices in a networked environment.

In the current computing world, there are a number of different bus structures. Each different bus structure requires different supporting software, which is often called the support stack. For example, different buses, such as 1394, 802.11, and USB are now used on computers. For each different bus, a support stack having a user interface layer, a driver layer, and a bus adapter layer is necessary. The bus adapter layer is a nontrivial piece of software. It is this portion that must be redone each time changes are made to the bus, and each time a new bus is added. These changes, additions, and alterations can take years to stabilize. It can, therefore, be seen that a need exists to development a system in which the transport level, on which the bus adapter rests, is generalized. If a system is developed in which all peripheral devices communicate over a network, it will be possible to introduce a network stack, even when the peripheral device resides on a local bus. This will allow a single stack, which can support all of the peripheral devices, leading to a lower cost in software maintenance and stability.

Recognizing the need to move toward a network model, manufacturers of certain devices, such as imaging devices, have begun to manufacture devices incorporating an Ethernet network connection. This allows a user to plug the peripheral device into the network. These devices also have associated software that allows a computer on the network to communicate with the specific device to enable it to perform its functions, such as a scan. However, this is a very device-specific solution. This solution requires specific software to be developed for each device. Moreover, the software that is written is effectively a low-level bus enumerator. In the Microsoft Windows Operating System, this software is written in the kernel mode. Typically, developing and altering software in the kernel mode is a difficult task. There is, therefore, a need to generalize the device-specific solutions that exist in the world today. It would be beneficial if all device manufacturers, such as imaging device manufacturers, were able to install a driver that is needed to communicate with their device, and that after such an installation, the device appears and functions as if locally connected to the computer.

In current operating systems, this generalization is not supported, and does not exist. For example, in the Windows Operating System family, an imaging device that is connected through a network does not appear to the operating system as a real device. Thus, if a scanner is connected to the computer through a network, the scanner will not appear in the device manager as a piece of hardware. As such, the network device cannot be managed and controlled, as could a locally connected device. Thus, the driver for the device cannot be properly managed, any updated drivers will not be found and installed, etc. It can therefore be seen that a need exists for a computer system and method that will support network-connected peripheral imaging devices. This need should be addressed on a global basis without the resources required for device-specific solutions.

BRIEF SUMMARY OF THE INVENTION

The present invention is directed to a method and computer system that supports network-connected peripheral devices. More specifically, the present invention provides a computer-implemented method and system for supporting hardware devices that are connected to the computer via a network. The existence of any hardware device connected on the network is detected in the method. Information descriptive of the connected device is then obtained, either from the device or from the user. Based upon the obtained information, a logical representation of the connected device is created. The driver for the detected device is then located and installed. From this point on, the network-connected hardware device appears to the computer in the same manner as a locally connected hardware device.

Additionally, a computer-implemented service listener component is provided.

The service listener functions, in part, to detect hardware devices that are connected to a network on which the computer is also connected. The service listener includes a listening module component that contains instructions for receiving messages that indicate a hardware device is connected to the network. The service listener also includes an installation component that contains instructions for locating and installing a driver for the hardware device that is connected to the network.

Additional advantages and novel features of the invention will be set forth in the description which follows, and in part will become apparent to those skilled in the art upon examination of the following, or may be learned from practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention provides a method and computer system for use in supporting network-connected peripheral devices. In the method, the computer user will connect an imaging device to a network. The method will determine if the device is auto-discoverable, such as by a user-initiated action to search for discoverable devices on the network or through automatic device notification. If the device is auto-discoverable, the new imaging device is detected on the network. Once the device is discovered, a logical representation of the device is created, and the driver for the discovered device is installed. Once the driver is installed, a message is broadcast to all applications running on the computer that a new device has arrived. As the message is received, a service application will find the appropriate driver for the device and will load that driver. Thereafter, the loaded driver will facilitate communication with the device and the device will appear to the operating system the same as any other locally connected peripheral device. If the device is not auto-discoverable, the user can enter the device information to enable the support of the computer system for the device.

Having briefly described an overview of the present invention, an exemplary operating environment for the present invention is described below.

Exemplary Operating Environment

Figure 1:
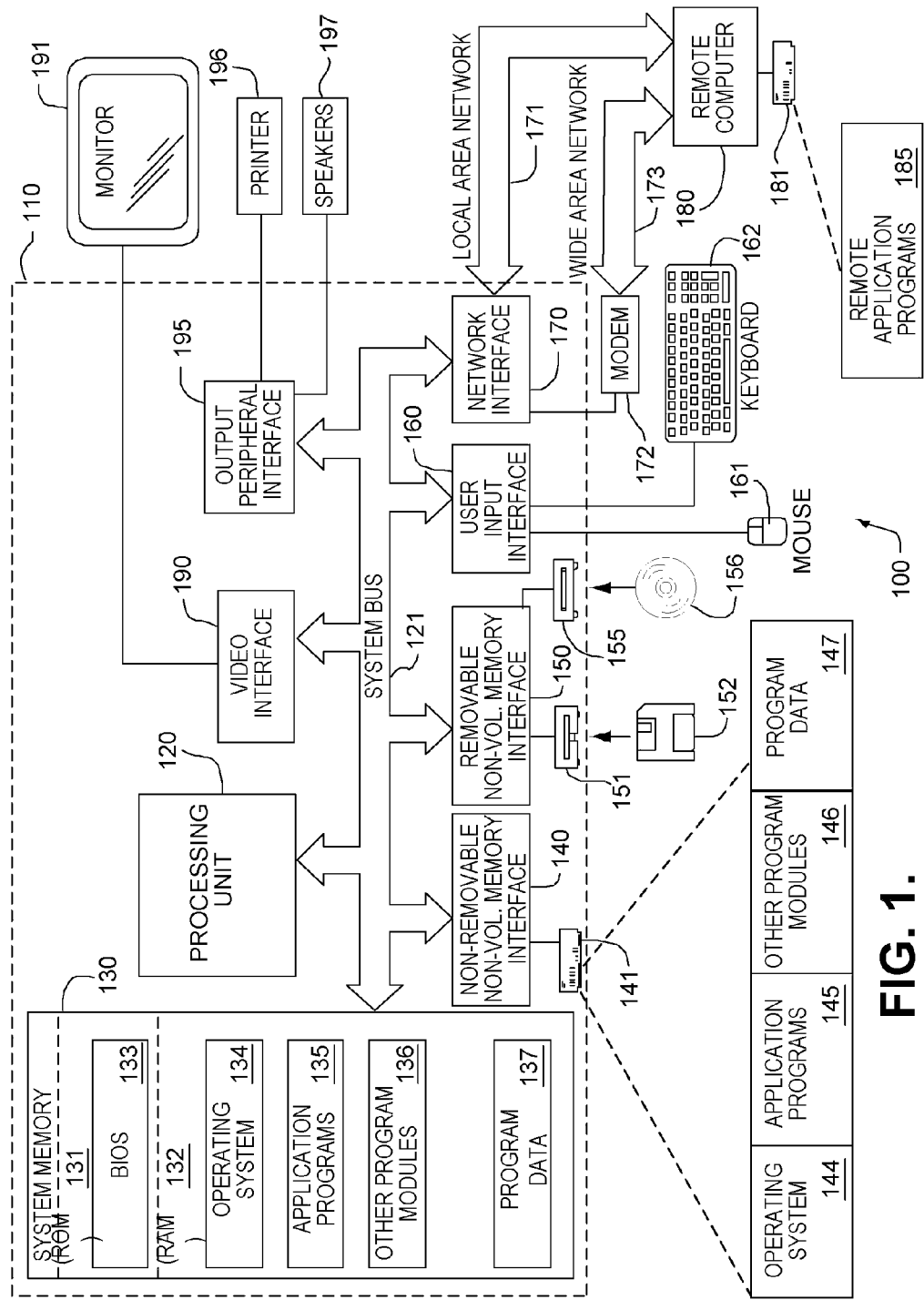
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing and using the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

System and Method for Supporting Network Devices

In computer operating systems today, network devices are typically treated differently than locally connected devices. For example, in the Windows family of operating systems from Microsoft Corporation of Redmond, Wash., networked devices are not treated as hardware devices that are locally connected to the host computer. There is, therefore, no way currently of logically representing a remotely connected networked device as a piece of hardware physically connected to the computer. This invention addresses this deficiency by providing a method and mechanism for finding a network-connected device and treating it as a locally connected device.

Figure 2:
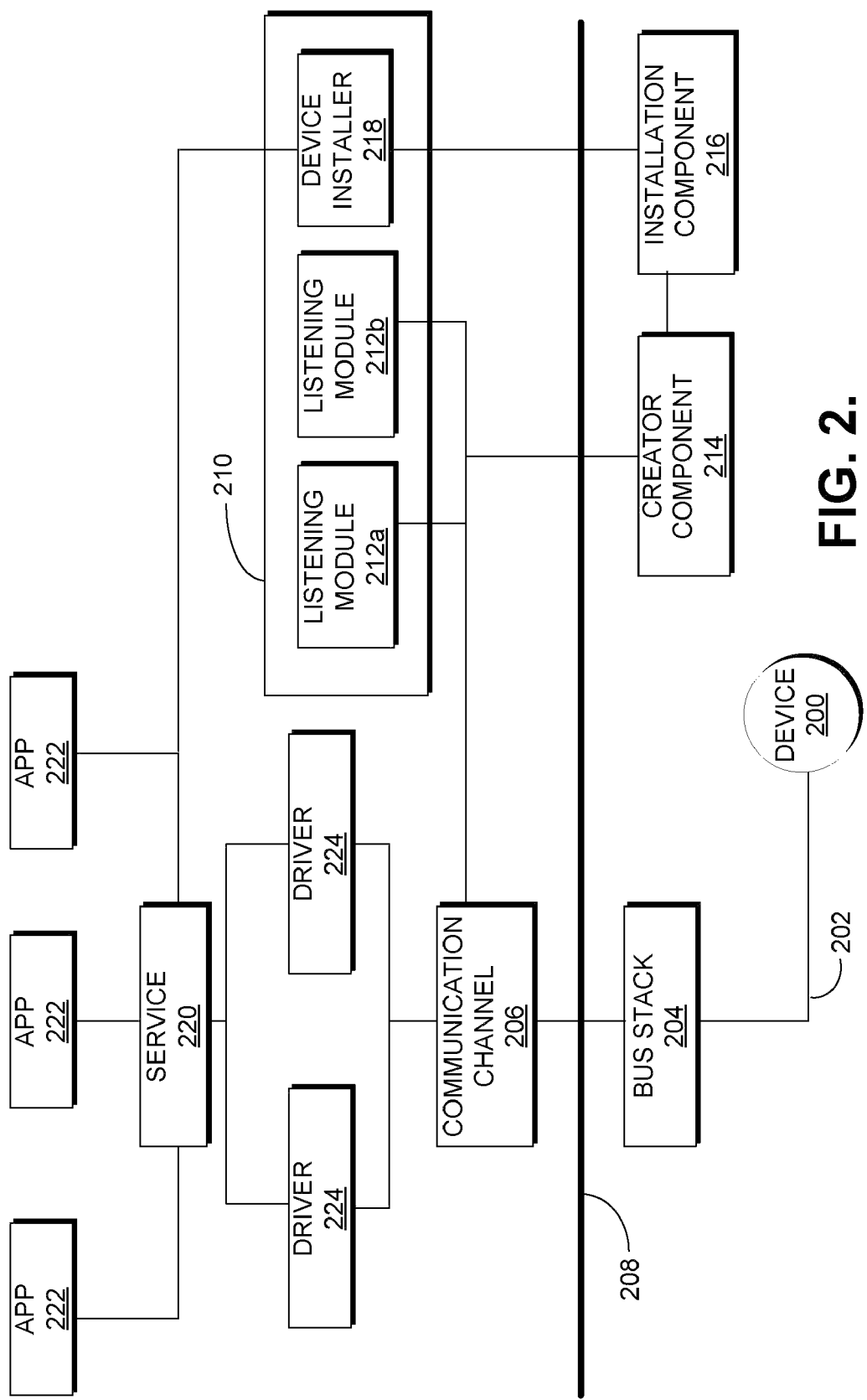
FIG. 2 is a schematic diagram of the basic components in one embodiment of the present invention.

To better understand the invention, the schematic diagram of FIG. 2 illustrates the basic components of the invention and their relationship. Turning to FIG. 2, a networked device 200 is shown. This device can be any number of a variety of peripheral devices, such as those discussed above with respect to FIG. 1. For example, device 200 can be a scanner connected to the network. The device 200 is connected to a network 202. For example, network 202 can be an Ethernet network and the device 200 would then have an Ethernet connection thereon. The network communicates through a bus stack 204. In the Windows operating environment, bus stack 204 can be a kernel bus stack equipped to communicate with the Ethernet network 202. This network stack 204 can be used even for devices connected on a local bus. In this environment, all devices, even local devices, communicate over the network. To do so, a conversion or mapping layer is provided in the stack that allows a network stack to be placed on a locally-connected stack. The bus, either network or local, is thus abstracted from the top-most layers. This allows a single stack to be used that supports all devices. The use of a single stack results in a more stable system and lower maintenance costs. Moreover, utilizing a single network stack eliminates the need to rewrite the bus adapter layer of the bus stack each time changes are made to a bus or each time a bus is added. The provided mapping layer is an operating system provided layer, which frees third-party vendors of the need to provide a kernel driver solution. There will still be a small bus-specific layer for every bus, but the size of this layer is minimized in the network environment and can be provided by the operating system instead of other vendors.

Continuing with FIG. 2, the kernel bus stack 204 communicates with a communication conduit 206. Continuing with the Windows Operating System example, the communication conduit 206 is typically known as Winsock. As a matter of general background, the bus stack 204 operates in the kernel mode and the communication conduit 206 operates in the user mode. The line 208 in FIG. 2 notes this differentiation of modes. The kernel is the core of an operating system, and is the portion of the system that manages memory, files, and peripheral devices. The kernel also functions to maintain the time and date, launches applications, and typically allocates system resources. Typically, changes or additions in the kernel are more difficult to develop and implement.

A service listener 210 is provided that also communicates through the conduit 206. A service, generally, is a program or routine that provides support to other programs. In this instance, service listener 210 defines an interface through which one or more listening modules 212 communicate. The listening modules 212 listen for specific device announcements on the network. For example, listening module 212a could be a module that listens for PnP devices. PnP is a set of specifications that allows the computer to configure itself automatically to work with peripherals such as monitors, modems, and printers. PnP listening module 212a thus listens on the network for any announcements of a PnP device connection to the network. Alternatively, listening module 212b could be a module that listens for proprietary devices. For example, the listening module could listen for Hewlett Packard scanners or other devices. The listening modules 212 are in communication with the network 202 and wait for announcements for connected devices on the network. Continuing with the above example, if a PnP device 200 is connected on the network, listening module 212a will discover the announcement on the network and will recognize that device. The listening modules 212 then communicate any announcements to the service listener 210. The service listener 210, upon learning of a new device, determines whether that device already is recognized. Each device has a unique ID by which it is recognized. If the device ID is already recognized, the service listener 210 will determine if any alterations, such as the IP address, regarding the device are needed. If the device is not recognized, the service listener will ask for a logical representation of the device to be created. This function is carried out by the creator component 214. In the Microsoft Windows environment, the logical representation of a device is called a device node. Thus, in the Microsoft Windows environment, the creator component 214 will create a device node for the discovered device.

Once a device node is created, the logical representation of the device appears to the computer, and the computer understands that the device is connected. From this point, the device is treated much the same as a device connected locally. The creation component 214 communicates with a kernel installation component 216. In the PnP example, the component 216 is a PnP subsystem. Component 216 communicates with a device installer 218 in the user mode. The device installer can be a Windows Imaging Acquisition (WIA) class installer or other facility that coordinates the installation of devices and drivers for the devices. Thus, the device installer 218 will install a driver for any newly attached and discovered network device. Once the driver is installed, a message is broadcast to another service 220. Service 220 is an application that loads communication specific libraries and that knows how to speak to a variety of devices. It also provides an interface for communication. In the Windows Operating System, service 220 is known as WIA service. The service 220 communicates the broadcast message to all applications 222 running in the operating system. The message communicates that a new device has arrived and is connected. Exemplary applications 222 can include any of a number of software applications. Upon receiving the message, service 220 will also find the appropriate driver 224 associated with the newly announced and discovered device. The appropriate driver 224 is then loaded. The loaded driver 224 knows how to speak to the associated device 200 and communicates through the conduit 206. The device 200 appears at this point to the computer to be the same as a physically connected, local device. As such, the device can be controlled and managed to the same degree as a locally connected device.

Figure 3:
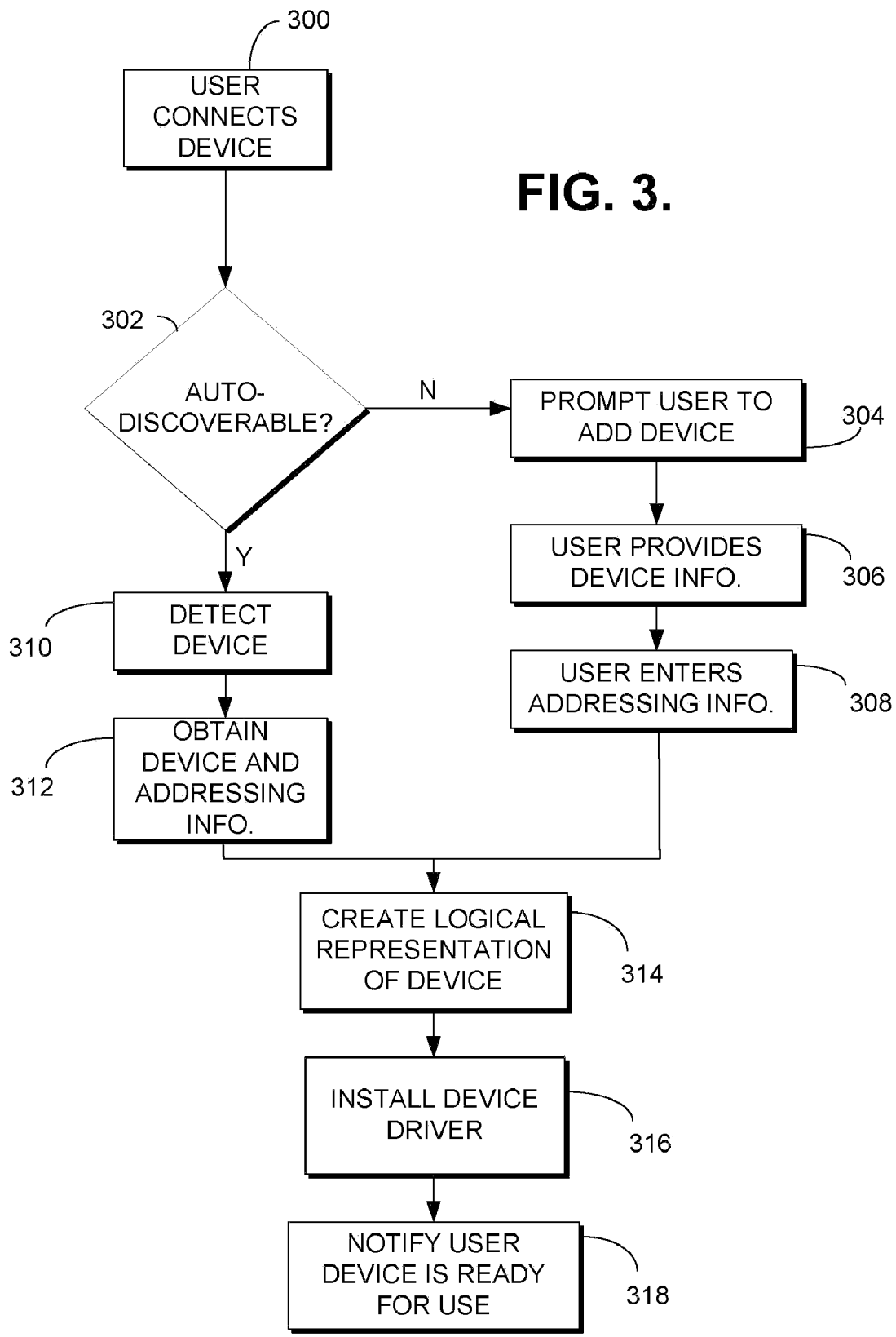
FIG. 3 is a flow chart illustrating certain aspects of the present invention.

A simplified flow diagram is shown in FIG. 3 illustrating the basic methodology employed by the components in FIG. 2. After the flow of FIG. 3 is discussed, a more detailed flow will be described with reference to FIG. 2. In FIG. 3, a user connects a device to the network, as shown in step 300. After the device is connected, the method determines whether the device is auto-discoverable, as shown at 302. An increasing number of modem network devices are auto-discoverable by the computer system. However, older devices that are still in use today are sometimes not auto-discoverable. If the device is not auto-discoverable, the user is prompted by the computer to add the device, as shown at 304. For example, a wizard or other help facility can be used to guide the user in the installation of the device. As part of this process, the user will select and provide the device manufacturer and model that the user desires to install, as shown at 306. Additionally, as shown at 308, the user also enters the device addressing information.

If, however, the device is auto-discoverable, the device is detected when it is connected to the network, as shown at 310. This detection can be achieved through operating system software or through other third party vendor software. When the device is detected at 310, the method continues by obtaining, from the device, its addressing information and a device description, as shown at 312. Following steps 312 and 308, the logical representation for the newly connected device is created at 314. In the Microsoft Windows environment, a device node is created by the PnP subsystem. With the device node created, the installation component installs the associated driver for the device, as shown at 316. The driver is loaded and the user is notified that the device is ready for use, as shown at 318.

This flow can also be seen in more detail with reference to FIG. 2. In FIG. 2, the user connects the device 200 to the network 202. For auto-discoverable devices, the device announces itself, by sending messages over the network. These messages travel through the bus stack 204 and the conduit 206, arriving at the associated listening module 212. The listening module 212 notifies the service listener 210 of the device arrival. The service listener 210 then informs the operating system of the device arrival and asks for a logical representation of the device to be created by creation component 214. In the Microsoft Windows example, a device node is created by component 214. The service listener 210, in user mode, communicates through the conduit 206 and the network stack 204, into the kernel mode and asks for a device node to be created. So, in effect, the service listener acts much like a bus enumerator, but does so in the user mode. Typical bus enumerators operate deep in the kernel. The result of the user mode service listener 210 is the elimination of a need to write a low-level kernel driver each time a device is connected on a specific bus. A method is provided for discovering the network-connected device, so the bus driver in the kernel mode can remain small. The mechanism for discovering the device is defined at a much higher level that than the kernel. As stated above, changes and additions to the kernel layer are typically more difficult to effect than are changes in user mode. The creation component 214 is a thin kernel driver provided by the operating system that enables anyone who calls it to create a device node.

Following device node creation, the installation component, such as a PnP subsystem will initiate the installation component 218 to install the driver for the device 200. Once the driver is installed, a message is broadcast to all running applications 222 that a new device 200 has arrived. The service 220, such as the WIA service, receives this notification message and finds and loads the appropriate driver. The loaded driver then communicates with the device 200 so that a communication channel to the device 200 is established. From this point on, the device 200 appears the same as a device that is locally connected to the computer. The network-connected device can then be treated as any other piece of hardware connected to the computer. For example, the driver can be managed or the computer can search for and install updated drivers for the device, etcetera. The above-described system and method thus accommodates any number of network-connected devices and incorporates them into the existing computer system in a more meaningful way.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set for above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer-implemented service listener for detecting network-connected hardware devices, comprising:
   the service listener operable in a computer;
   at least one listening module component operable without a search request containing instructions for receiving announcement messages, wherein the announcement messages are indicative of a class of hardware devices present on a network associated with the at least one listening module component, and for requesting the creation of a logical representation of any hardware device for which the announcement message is received wherein the logical representation is a device node; and an installation component containing instructions for a device driver in the network and installing the device driver for the hardware device present on the network, wherein the service listener is implemented in user mode wherein the service listener notifies an operating system of the computer of an arrival of the hardware device.

2. A computer-implemented system, comprising:

a service listener operable in a computer;

the service listener operable to detect network-connected hardware devices, to request the creation of a logical representation of any hardware device for which a message is received from at least one listening module component, wherein the at least one listening module is configured to recognize hardware devices associated therewith, and to notify an operating system of the computer of an arrival of the hardware device wherein the logical representation is a device node;

the at least one listening module component in the service listener operable to automatically detect a hardware device connected to a network when the hardware device announces a connection, and to communicate a discovery of the hardware device associated therewith to the service listener; and an installation component in the service listener operable to contain instructions for locating a device driver in the network an installing the device driver for the hardware device present on the network, wherein the service listener is implemented in user mode.

3. A computer-implemented service listener for detecting network-connected hardware devices, comprising:

the service listener operable in a computer;

at least one listening module component containing instructions for automatically detecting a hardware device present on a network, wherein the at least one listening module component is configured to detect the hardware device associated therewith, and for requesting the creation of a logical representation of any hardware device for which a message is received wherein the logical representation is a device node; and an installation component containing instructions for locating a device driver in the network and installing the device driver for the hardware device present on the network, wherein the service listener is implemented in user mode wherein the service listener notifies an operating system of the computer of an arrival of the hardware device.

4. A computer-implemented service listener for detecting network-connected hardware devices, comprising:

the service listener operable in a computer;

at least one listening module component containing instructions for automatically detecting an imaging device present on a network, wherein the at least one listening module component is configured to detect the imaging device associated therewith, and for requesting the creation of a logical representation of any imaging device for which a message is received wherein the logical representation is a device node; and an installation component containing instructions for locating a device driver in the network and installing the device driver for the imaging device present on the network, wherein the service listener is implemented in user mode wherein the service listener notifies an operating system of the computer of an arrival of the hardware device.

* * * * *